March 1, 1949. H. L. SMITH ET AL 2,463,125
JUICE EXTRACTING MACHINE
Filed May 1, 1946 4 Sheets-Sheet 1
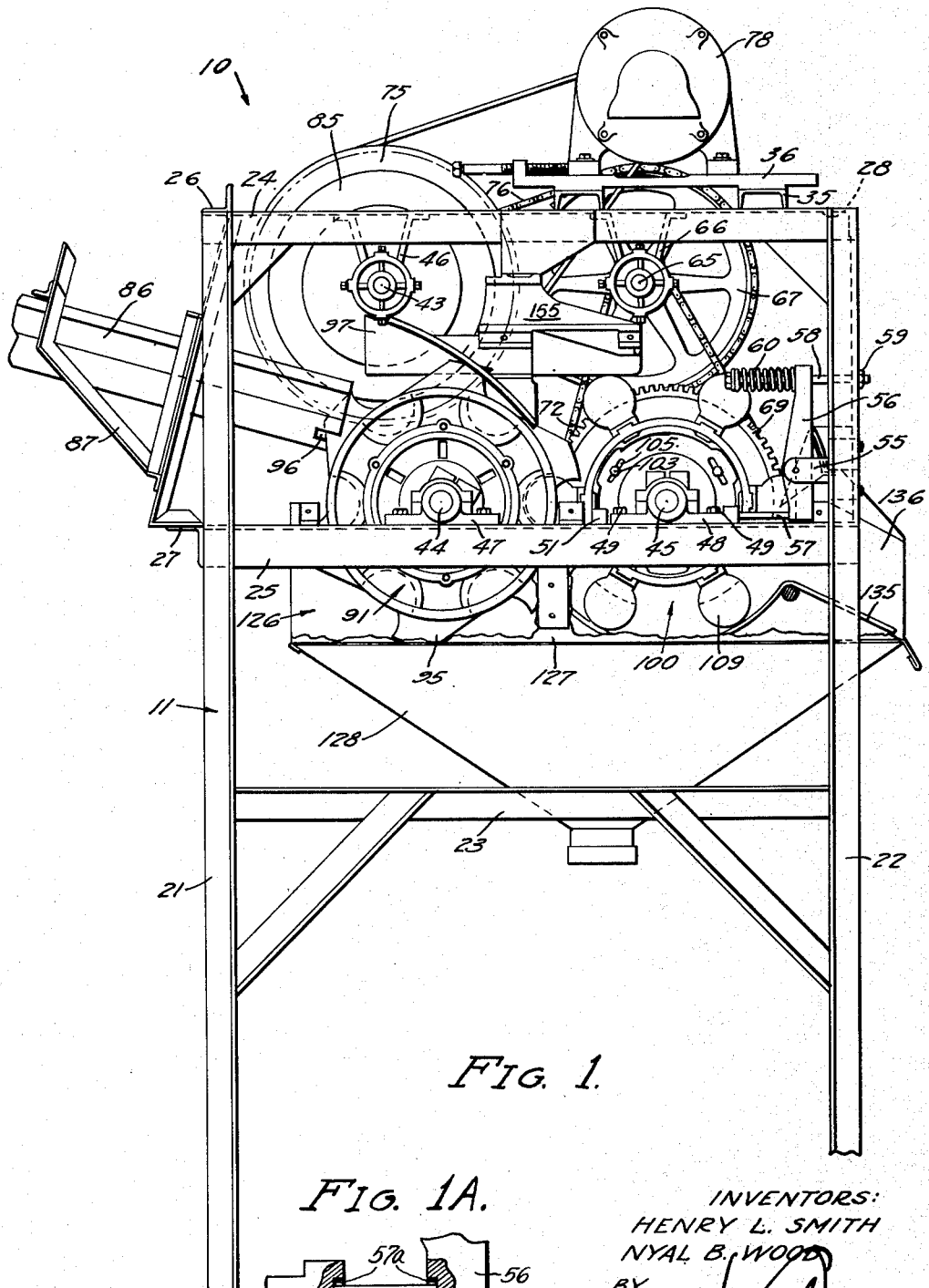
FIG. 1.
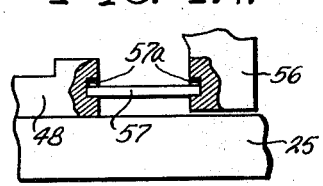
FIG. 1A.
INVENTORS:
HENRY L. SMITH
NYAL B. WOOD
BY
ATTORNEY

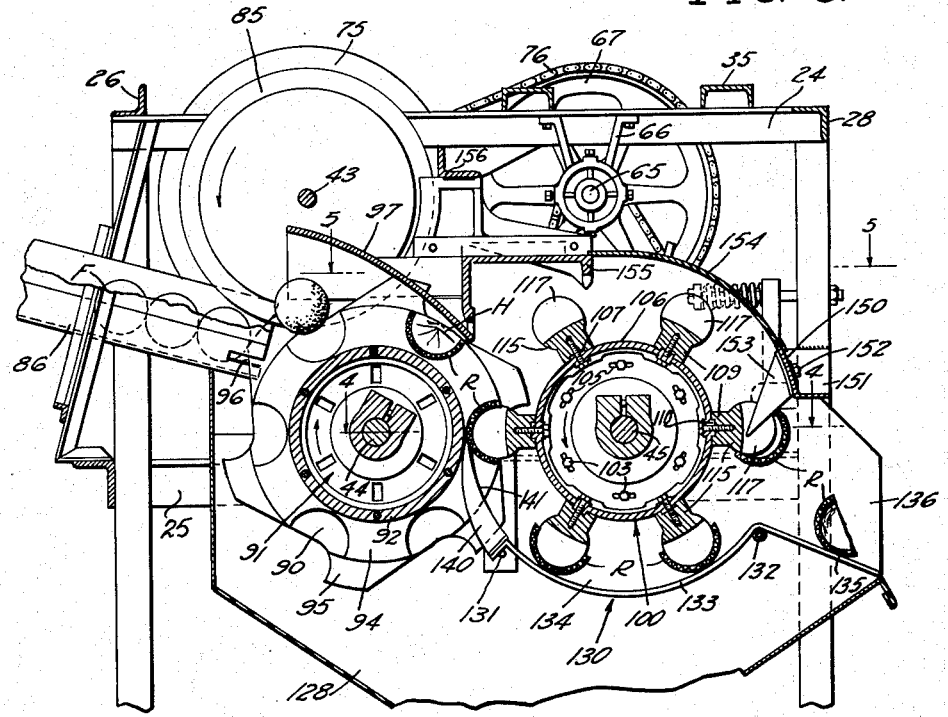

March 1, 1949.  H. L. SMITH ET AL  2,463,125
JUICE EXTRACTING MACHINE
Filed May 1, 1946  4 Sheets-Sheet 4

INVENTORS:
HENRY L. SMITH
NYAL B. WOOD
BY
ATTORNEY

Patented Mar. 1, 1949

2,463,125

UNITED STATES PATENT OFFICE 2,463,125

JUICE EXTRACTING MACHINE

Henry L. Smith and Nyal B. Wood, Clearwater, Fla., assignors to Food Machinery and Chemical Corporation, San Jose, Calif., a corporation of Delaware Application May 1, 1946, Serial No. 666,477

7 Claims. (Cl. 100—47)

This invention relates to machines for extracting juice from citrus fruits.

It is an object of the invention to provide a novel and efficient juice extractor of the type which first severs the fruit in two and then presses the juice from the halves.

Another object is to provide such a machine of relatively high capacity.

A further object is to provide such a machine in which the removal of the rind halves from the pressure mechanism is positive, thereby preventing these rind halves jamming said mechanism.

The manner of accomplishing the foregoing objects, as well as further objects and advantages, will be made manifest in the following description taken in connection with the accompanying drawings in which:

Fig. 1 is a front elevational view of a preferred embodiment of the invention.

Fig. 1A is a detail view of a bearing, a rocker, and a link of the invention with portions of the bearing and rocker broken away to illustrate pockets therein into which opposite ends of said link extend.

Fig. 3 is a sectional view taken on the line 3—3 of Fig. 2.

Fig. 4 is an enlarged fragmentary sectional view taken on the line 4—4 of Fig. 3.

Figure 2:
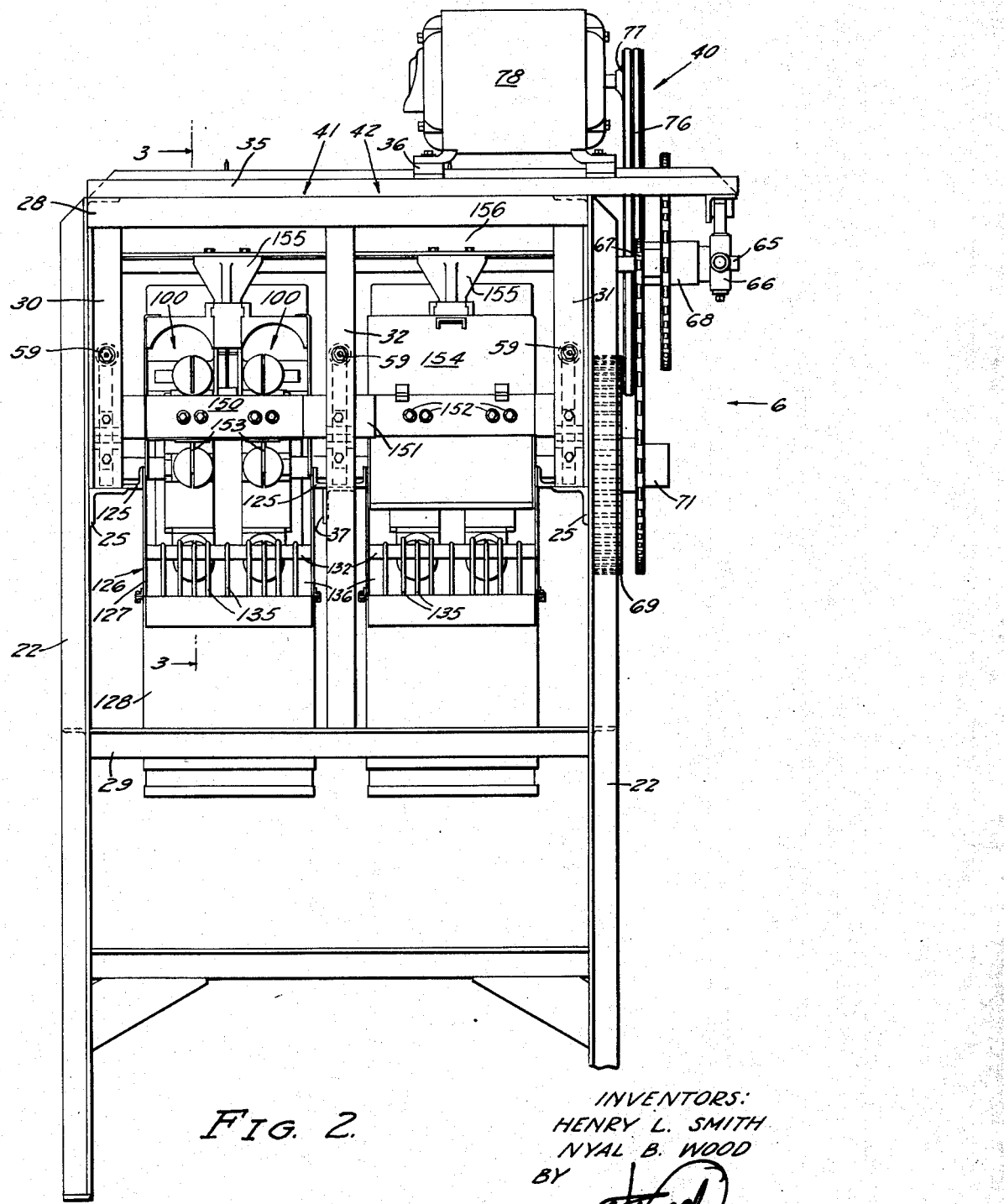
Fig. 2 is a side elevational view of Fig. 1.
Figure 5:
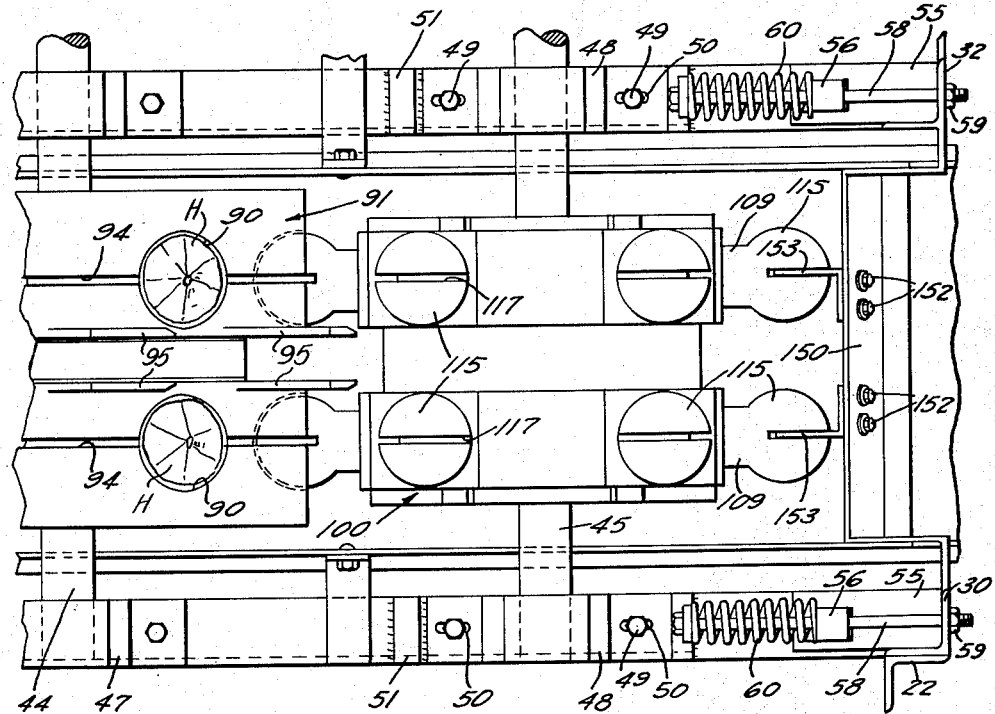
Fig. 5 is an enlarged diagrammatic fragmentary sectional view taken on the line 5—5 of Fig. 3.

Referring specifically to the drawings, the invention is there shown as embodied in a juice extracting machine 10 having a structural steel frame 11. The frame 11 includes left corner and right corner legs, 21 and 22 respectively, which are suitably connected by lower bracing 23, by upper cross bars 24 and 25, by left side bars 26 and 27 and right side bars 28 and 29. The side bar 28 is connected to the cross bars 25 by vertical bars 30 and 31 and the cross bars 28 and 29 are connected centrally by a vertical bar 32. Supported at their opposite ends on front and rear cross bars 24 are channel irons 35 on which are mounted a pair of motor rests 36. Disposed on the same level as the frame members 25 and joining the left side frame member 27 and vertical bar 32, is a cross bar 37.

Mounted on the frame 11 is a power drive mechanism 40 (Fig. 6) and two juice extracting units 41 and 42 (Fig. 2) which are driven by and united with the mechanism 40 by drive shafts 43, 44 and 45. The mounting of these drive shafts will thus be described before describing the mechanism 40 or the units 41 and 42.

The drive shaft 43 journals in bearings 46 mounted on cross bars 24. The shaft 44 journals in bearings 47 which rest upon and are fixed to cross bars 25 and 37. Shaft 45 journals in bearings 48 which rest on and are slideably secured to the cross bars 25 and 37 by cap screws 49 which extend through slots 50 in said bearings. Fixed as by welding to the cross bars 25 and 37 just inwardly from the bearings 48 are stops 51 which limit the inward movement of the bearings 48 in a manner and for a purpose which will be made clear hereinafter.

Fixed on the vertical bars 30, 31 and 32 (see Figs. 1 and 2) are rocker blocks 55 on which are mounted rockers 56, the lower ends of these rockers being spaced from the bearings 48 by links 57, the opposite ends of which extend loosely into suitable pockets 57a formed in the bearings 48 and rockers 56. Extending loosely through suitable holes provided in the upper ends of the rockers 56 are bolts 58, the outer ends of which extend loosely through holes in the vertical bars 30, 31 and 32 to receive nuts 59. Trapped between the heads of these bolts and the rockers 56 are coiled compression springs 60 which exert a yieldable pressure against the rockers 56 to urge the bearings 48 towards engagement with the stops 51.

The drive mechanism 40 (Figs. 1, 2 and 6) also includes a countershaft 65 which is journalled in bearings 66 provided on the frame 11 and which has a pinion sprocket 67 and a large sprocket 68. The shafts 44 and 45 are provided with gears 69 and 70 which are of the same diameter and mesh with each other. The shaft 45 also has a large sprocket 71 which is connected by a chain 72 to the pinion sprocket 67. The shaft 43 has a pinion sprocket 73 which is connected by a chain 74 to the large sprocket 68 on the shaft 65. The shaft 43 also has a large pulley 75 which is connected by a belt 76 to a drive pulley 77 of an electric motor 78 which is mounted on the motor rests 36.

Figure 6:
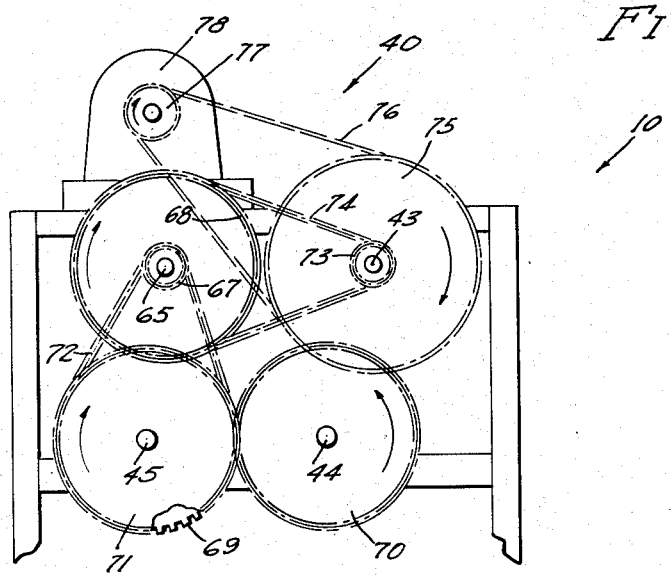
Fig. 6 is a diagrammatic rear elevational view of the machine taken in the direction of arrow 6 in Fig. 2 and illustrating the drive mechanism of said machine.

It is thus seen from the above description and an inspection of Fig. 6 that energizing the motor 78 drives the shafts 43, 44 and 45 in the directions of the arrows which appear in this figure concentric with the shafts. It is also evident that the shaft 43 is driven at a much higher rate of speed than the shafts 44 and 45.

As units 41 and 42 are identical, unit 41 alone will be described in detail as this will suffice for both. It will be understood of course that unit 41 is mounted on and driven by those portions of shafts 43, 44, and 45 which are located between the vertical bar 30 and the vertical bar 32 while the unit 42 is mounted on and driven by those portions of these shafts which are located between the vertical bar 32 and the vertical bar 31 (Fig. 2). It is also to be understood that these units are operated simultaneously by the rotation of these shafts by the power mechanism 42.

Juice extracting unit 41 (Fig. 3) includes a rotary disc cutter 85 which is fixed on the shaft 43 and to which citrus fruit such as oranges F are fed through a trough 86 mounted on a structure 87 which is supported on the left side bars 26 and 27. Straddling the disc cutter 85 are two radially disposed series of fruit half receiving cups 90 (Figs. 3 and 4) which are provided on a rotary fruit carrier 91 fixed on the shaft 44. Each series of cups 90 are formed integral in an annular casting 92 which is secured to the carrier 91 by bolts 93 and is provided with an annular radial slot 94 which extends centrally through the cups 90.

Extending from each casting 92 along the inner edge of its periphery are fruit hooks 95 which are adapted to extend through slots 96 in the chute 86, engage the foremost orange F in the chute, carry this upwardly against the rotating cutter 85 causing this orange to be severed into halves, one of which falls into each of the cups 90 disposed on opposite sides of the cutter adjacent this particular pair of hooks 95. Supported on the frame 11 on each side of the cutter 85 is a guide 97 which guides the fruit halves H into the cups 90 with the rinds R of the fruit halves facing inwardly (Fig. 3). The guide 97 operates to cam the fruit halves into place in the cups substantially as this is done by the guides 73 and 74 shown in U. S. Letters Patent, No. 2,332,177, issued on October 19, 1943 to Henry L. Smith, one of the present applicants.

The juice extracting unit 41 also includes a plunger rotor 100 which is fixed on the shaft 45 and includes a hub 101 having a flange 102 which is secured by bolts 103 to a rim 104, this rim having slots 105 through which said bolts pass to permit rotational adjustment of the rim of the rotor relative to the hub thereof. Formed on the rim 104 are two cylindrical faces 106 across which a series of transverse bosses 107 extend, the rim having slots 108, one of which extends through each of these bosses. Mounted on each of the faces 106 is a series of plungers 109, each plunger having a recess 110, which fits one of the bosses 107, and a threaded hole 111 for receiving a cap screw 112 which extends through the slot 108 of that boss to secure this plunger 109 to the rotor 100. The slots 108 give an opportunity for adjusting each plunger 109 parallel with the shaft 45.

Each plunger 109 has a spherical head 115, the radius of which is slightly less than that of the interior surfaces of the cups 90 so that when the plungers 109 are properly adjusted on the rotor rim 104 and the latter properly adjusted rotationally relative to the hub 101 of the rotor 100, the plungers 109 mesh with the cups 90 (Fig. 4). Thus, when these cups are empty and the springs 60 press the bearings 48 snugly against the stops 51, a space 116, which is substantially uniform in depth, separates all portions of each cup 90 and spherical head 115 of the plunger 109 which extends into this cup when this plunger and cup are in maximum meshed relation.

Each plunger head 115 is provided with a slot 117 which lies in a plane passing through the center of this head and lying at right angles to the axis of the shaft 45. When the plungers 109 of each series are properly adjusted so as to mesh as aforesaid with the corresponding series of cups 90 on the fruit half carrier 91, the slots 117 of this series of plungers are all aligned in the same radial plane.

Supported on the cross bars 25 and 37 as by angled brackets 125 is a housing 126, including side walls 127, from the lower end of which is suspended a juice funnel 128. In Fig. 1, the front side wall 127 is broken away to illustrate the mechanism enclosed therein. Fig. 2 shows how this front side wall extends upwardly to cover the carrier 91 and plunger rotor 100, as well as the lower portion of the cutter 85 where this side wall encloses the space in which the orange halves are delivered to the cups 90 of the carrier.

The housing side walls 127 also have mounted thereon a rind ejecting and guiding device 130 which includes cross bars 131 and 132 on which a series of parallel rods 133 are mounted. The rods 133 are arcuately shaped between the bars 131 and 132 so as to be concentric with the shaft 45 and these portions of rods 133 are disposed in closely spaced relation with the radial extremities of the plunger heads 115 as the latter swing through the lower portion of their path of travel about this shaft. The rods 133 extend beyond the bar 132 to form a rind discharge ramp 135 which terminates at a rind discharge opening 136 in the housing 126.

Fixed on the bar 131 is a pair of rind half ejectors 140, one of which extends into each of the annular radial slots 94 of the rotary carrier 91 and has an inner surface 141 which is a continuation of the arcuate contour of the rods 133 above described. Extending between vertical bars 30 and 32 is an arcuate stripper base 150 which has outwardly turned feet 151 at its opposite ends which are secured as by welding to said vertical bars. Secured by bolts 152 to the stripper base 150 is a pair of strippers 153, each of which lies in the plane of the slots 117 of one of the series of plungers 109 provided on the plunger rotor 100 (Fig. 3). The housing 126 includes a removable hood 154 which rests on the stripper base 150 and a bracket 155 which is suspended from a transverse angle iron 156 carried by the frame bars 24. The brackets 155 also serve to support the fruit half guides 97. Each hood 154 covers the rotor 100, disposed therebeneath, while the machine is in operation.

Operation

Before starting to operate the juice extracting machine 10 it is adjusted as hereinabove described. The motor 78 is then energized so as to cause the drive shafts of the machine to rotate as indicated in Fig. 6. This causes the rotation of the cutters 85 at a high speed and the rotation of the fruit half carriers 91 and plunger rotors 100 at relatively low speeds. It also causes the plunger heads 115 of the rotors and the cups 90 of the carriers to mesh as clearly shown in Fig. 4 and above described.

Fruit of a suitable size such as oranges F are now fed along the chutes 86 leading to the two juice extracting units 41 and 42. In each of these units, the fruit is caught by the hooks 95 of the rotating carrier 91 thereof, severed in two to form two halves which fall in the pair of cups disposed on opposite sides of said hooks, these halves being held and in some instances straightened in these cups by the guides 97 as these cups pass under these guides. Thus, as each cup 90 moves into meshing relation with one of the plunger heads 115, it contains a fruit half H and the plunger head moving into the cup containing this half is pressed into the juice bearing structure of that half so as to completely express the juice from this structure and compress the membranes thereof into a dry pulp against the rind R. Some of the juice expressed by each plunger head 115 enters the slot 117 of that head and escapes from this through the portion of this slot which is disposed downwardly and uncovered by the rind R. All of the juice extracted in this operation drains downwardly and is collected by the funnel 128 from which it is delivered into suitable containers.

At the moment of maximum penetration of each cup 90 by one of the plunger heads 115, the rind R in the cup comes into contact with a rind ejector 140 and the pressure of the latter against this rind causes it to follow the path of the inner surface 141 of this ejector and thus remain in intimate contact with and covering said plunger head 115 as the latter swings downwardly and out of said cup. The ejecting and guiding devices 130 thus retain the rinds R on the plunger heads 115 until these rinds move out of contact with the rods 133 opposite the rind discharge openings 136. If the rinds R are not flung off the plunger heads 115 by centrifugal force and outward through said openings, they are stripped from the heads 115 by the strippers 153 entering the slots 117 as shown in Fig. 3. The rinds thus stripped from the heads 115 are deposited outwardly on the ramps 135 and gravitate through the openings 136 into a container provided to receive the same.

While the machine 10 is shown as having two extracting units 41 and 42, this may have only a single unit or it may have three or four units.

The fruit handled by machine 10 must be within a certain range of diameters in order for the juice to be efficiently extracted therefrom by a given set of cups and plunger heads. In view of the variations in diameter of the fruit to be handled, it is preferable to make the cups and plunger heads in one unit smaller than those in another and then segregate the fruit according to size, directing the group to each of the units of the range of sizes suitable to be handled thereby.

From the above description, it is apparent that this invention provides a novel means for extracting juice from fruits having rinds, such as citrus fruits, in a continuous operation in which all of the moving parts are rotary and in which a simple and certain means is provided for collecting and delivering all of the juice at one point and all of the rinds at another point.

We claim:

1. In a juice extracting machine, the combination of: a rotary carrier having pockets opening from the periphery thereof for carrying cut pieces of fruit; means for supplying said pockets with said pieces of fruit with the rinds thereof disposed inwardly; a rotary extractor having a plurality of plungers on the periphery thereof; means for mounting and rotating said carrier and said extractor in meshing relation so that said plungers enter said cups and press the juice from said pieces of fruit without destroying said rinds; means for removing said rinds from said cups and retaining said rinds temporarily on said plungers; and means for thereafter stripping said rinds from said plungers.

2. In a juice extracting machine, the combination of: a rotary carrier having pockets opening radially from the periphery thereof for carrying cut pieces of fruit; means for supplying said pockets with said pieces of fruit, with the rinds thereof disposed inwardly; a rotary extractor having a plurality of plungers radially disposed on the periphery thereof; means for mounting and rotating said carrier and said extractor in meshing relation so that said plungers enter said cups and press the juice from said pieces of fruit without destroying said rinds; means for removing said rinds from said cups and retaining said rinds temporarily on said plungers; and means for thereafter stripping said rinds from said plungers.

3. In a juice extracting machine, the combination of: a rotary carrier having pockets opening from the periphery thereof for carrying cut piece of fruit; means for supplying said pockets with said pieces of fruit with the rinds thereof disposed inwardly; a rotary extractor having a plurality of plungers on the periphery thereof; means for mounting and rotating said carrier and said extractor in meshing relation so that said plungers enter said cups and press the juice from said pieces of fruit without destroying said rinds; an ejector for removing said rinds from said cups, slots being formed in the walls of said cups to accommodate said ejector, said ejector being located so as to retain said rinds temporarily on said plungers when ejecting said rinds from said cups; and means for thereafter stripping said rinds from said plungers.

4. In a juice extracting machine, the combination of: a rotary carrier having pockets opening from the periphery thereof for carrying cut pieces of fruit; means for supplying said pockets with said pieces of fruit with the rinds thereof disposed inwardly; a rotary extractor having a plurality of plungers on the periphery thereof; means for mounting and rotating said carrier and said extractor in meshing relation so that said plungers enter said cups and press the juice from said pieces of fruit without destroying said rinds; means for removing said rings from said cups and retaining said rinds temporarily on said plungers; and a stripper for thereafter stripping said rinds from said plungers, slots being formed in said plungers to accommodate said stripper.

5. In a juice extracting machine, the combination of: a rotary carrier having pockets opening from the periphery thereof for carrying cut pieces of fruit; means for supplying said pockets with said pieces of fruit with the rinds thereof disposed inwardly; a rotary extractor having a plurality of plungers on the periphery thereof; means for mounting and rotating said carrier and said extractor in meshing relation so that said plungers enter said cups and press the juice from said pieces of fruit without destroying said rinds; an ejector for removing said rinds from said cups, slots being formed in the walls of said cups to accommodate said ejector, said ejector being located so as to retain said rinds temporarily on said plungers when ejecting said rinds from said cups; and a stripper for thereafter stripping said rinds from said plungers, slots being formed in said plungers to accommodate said stripper.

6. A combination as in claim 4 in which said plungers and cups are moving downwardly during the juice pressing operation and in which said plungers are rising during said stripping operation; and means for retaining said rinds on said plungers after said rinds leave contact with said ejector and until said plungers start to rise.

7. In a juice extracting machine, the combination of: a rotary carrier having pockets opening radially from the periphery thereof for carrying cut pieces of fruit; means for supplying said pockets with said pieces of fruit, with the rinds thereof disposed inwardly; a rotary extractor having a plurality of plungers radially disposed on the periphery thereof; means for mounting and rotating said carrier and said extractor in meshing relation so that said plungers enter said cups and press the juice from said pieces of fruit without destroying said rinds; an ejector for removing said rinds from said cups, slots being formed in the walls of said cups to accommodate said ejector, said ejector being located so as to retain said rinds temporarily on said plungers when ejecting said rinds from said cups; and a stripper for thereafter stripping said rinds from said plungers, slots being formed in said plungers to accommodate said stripper, the slots in said cup walls and in said plungers lying in a common plane passing through the centers of said cups and plungers.

HENRY L. SMITH.
NYAL B. WOOD.

REFERENCES CITED

The following references are of record in the file of this patent:

UNITED STATES PATENTS

| Number | Name | Date |
|---|---|---|
| 2,332,177 | Smith | Oct. 19, 1943 |
| 2,353,841 | McKinnis | July 18, 1944 |